United States Patent [19]

Dehennau et al.

[11] Patent Number: 5,164,432
[45] Date of Patent: Nov. 17, 1992

[54] MOULDING COMPOSITIONS COMPRISING POLYOLEFINS AND CELLULOSE FIBRES, PROCESS FOR THEIR MANUFACTURE AND OBJECTS WROUGHT FROM THESE COMPOSITIONS

[75] Inventors: Claude Dehennau, Waterloo; Paul Dubois, Ath; Edmond Mulkens, Braine-L'Alleud, all of Belgium

[73] Assignee: Solvay & Cie, Brussels, Belgium

[21] Appl. No.: 541,930

[22] Filed: May 31, 1990

[30] Foreign Application Priority Data

Jun. 7, 1989 [FR] France ............... 89 07634

[51] Int. Cl.⁵ .................. C08J 5/04; C08L 1/02
[52] U.S. Cl. ........................ 524/13; 524/443
[58] Field of Search .................. 524/13, 443

[56] References Cited

U.S. PATENT DOCUMENTS

| | | | |
|---|---|---|---|
| 4,307,155 | 12/1981 | Broxterman et al. | 428/514 |
| 4,352,854 | 10/1982 | Siedenstrang et al. | 428/318.8 |
| 4,380,522 | 4/1983 | Georlette et al. | 264/175 |
| 4,481,322 | 11/1984 | Godlewaki et al. | 524/265 |
| 4,717,742 | 1/1988 | Beshay | 523/203 |
| 4,889,879 | 12/1989 | Seinera et al. | 524/13 |

FOREIGN PATENT DOCUMENTS

| | | |
|---|---|---|
| 1269187 | 5/1990 | Canada . |
| 2203743A | 6/1988 | United Kingdom . |
| 2203743 | 10/1988 | United Kingdom . |

OTHER PUBLICATIONS

J. D. Ferry, Viscollectric Properties of Polymers (2d Ed.) pp. 12-15 (1970).
2 page French Search Report Article: Reinforcement of Polymer with Filler, Ernest A. Coleman, Society of Plastics Industry—Technical Proceedings Jun. 1984, pp. 284-288.

Primary Examiner—Nathan M. Nutter
Assistant Examiner—Jeffrey C. Mullis
Attorney, Agent, or Firm—Willian Brinks Olds Hofer Gilson & Lione

[57] ABSTRACT

Moulding compositions comprising a polyolefin, cellulose fibres and an unsaturated organosilane exhibiting a tensile elasticity modulus (E), measured at 100° C., higher than 1250 MPa and a ratio $G'/G''$ of their modulus $G'$, representing their elastic response, to their loss modulus $G''$, measured at 200° C. and at a frequency of 0.1 rad/s ($0.1\ s^{-1}$), with a value of at least 0.80.

13 Claims, No Drawings

MOULDING COMPOSITIONS COMPRISING POLYOLEFINS AND CELLULOSE FIBRES, PROCESS FOR THEIR MANUFACTURE AND OBJECTS WROUGHT FROM THESE COMPOSITIONS

The present invention relates to moulding compositions comprising polyolefins, cellulose fibres and an organosilane-based coupling agent. It also relates to a process for manufacturing these compositions. It relates further to objects wrought from these compositions.

From publication EP-A-0,008,143 (Solvay & Cie) it is known to work polyolefin-based compositions comprising polyolefins modified with polar monomers and cellulose fibres, said compositions being subjected to a kneading operation performed at a temperature at least 20° C. higher than the melting temperature of the polyolefin before being converted.

The mechanical properties of objects wrought from these compositions are good. However, their impact strength is no better than that obtained with a similar compositions containing unmodified polyolefins.

Reinforcement of thermoplastic polymers such as polypropylene using organic fillers (wood flour) making use of organosilane-based coupling agents has, furthermore, been described (E. A. Coleman in "Society of Plastics Industry—Technical Proceedings" (SPI/SPE '84), 21-23 Jun. 1984, pages 284 to 288). The tensile strength of polypropylene reinforced with 50% by weight of wood flour and containing 1% by weight of a binary coupling system based on unsaturated organosilanes, improved at normal temperature (approximately 25° C.) (op. cit., page 287, Table V), becomes inadequate at higher temperature.

Nevertheless, it is considered desirable in the industry that objects wrought from compositions comprising polyolefin and cellulose fibres—for example, the internal trim components of motor vehicles—be able to withstand traction and impact. In addition, it is desirable to maintain the rigidity at an acceptable level at high temperatures. None of the known compositions satisfies these conditions.

Compositions making it possible to manufacture shaped objects exhibiting an excellent combination of rigidity at high temperature and impact strength have now been found. An original process for manufacturing these compositions has also been found.

The present invention relates to moulding compositions comprising polyolefin, cellulose fibres and an unsaturated organosilane, exhibiting a tensile elasticity modulus (E) higher than 1250 MPa when measured at 100° C.

The modulus (E) of the moulding compositions according to the invention is preferably higher than 1300 MPa. This modulus (E) is most advantageously between 1350 and 2100 MPa.

This modulus (E) can be determined by application of one of the standards DIN 53457, ISO 527 or ASTM D 638.

However, the measurement of this modulus (E) is accurate only to about ±15%. This is why it is preferable that the compositions of the invention be defined subsidiarily using the ratio of two functions related to the stress frequencies of these compositions. These functions, modulus $G'$, representing elastic response (shear storage modulus) and the loss modulus $G''$ (shear loss modulus) are measured at frequencies of 0.01 radian (rad) per second to 100 radians per second the ratio $G'/G''$ representative of the compositions according to the invention is at least 0.80 when measured at 0.1 rad per second ((0.1 $s^{-1}$). The compositions of the invention which have the best properties are characterized by a $G'/G''$ ratio of between 0.85 and 1.

A $G'/G''$ ratio close to unity is representative of a more elastic behaviour of the compositions in the case of low stress frequencies.

In the specific case of the compositions according to the invention it is found that an increase in the $G'/G''$ ratio corresponds to an increase in modulus (E).

The moduli $G'$ and $G''$, the expressions linking them and other explanations concerning can be found in "Viscoelastic Properties of Polymers" by J. D. Ferry, 2nd edition, John Wiley & Sons, Inc., 1970, at pages 12 to 15.

The moduli $G'$ and $G''$ are evaluated at 200° C. using a rheometer which allows the dynamic mechanical properties of the polymers to be measured from the glassy or crystalline state to the molten state. The melt measurements are carried out on discs from 1 to 2 mm in thickness and 2.5 cm in diameter, taken from plaques extruded from the compositions according to the invention.

This measurement consists of determining the moduli $G'$ and $G''$ at a frequency of 0.1 rad per second (0.1 $s^{-1}$) and at a temperature of 200° C.

The polyolefins present in the compositions according to this invention may include any polymer containing generally at least 60% and preferably at least 90% monomer units derived from unsubstituted olefins which contains from 2 to 6 carbon atoms. By way of example, high density polyethylene, polypropylene, copolymers of ethylene with propylene, poly-1-butene, poly-4-methyl-1-pentene, copolymers of ethylene with propylene, ethylene-vinyl acetate copolymers and ethylene-vinyl chloride copolymers may be used. The best results are obtained with crystalline polyolefins consisting substantially of units derived from propylene (polypropylene).

The incorporation of mixtures of polyolefins in the compositions does not depart from the scope of the invention.

These polyolefins may contain the various additives usually added to polyolefins, such as fillers, in particular inorganic ones, stabilizers, lubricants, antiacid agents, impact modifiers, colorants and the like. These additives are preferably present in a proportion of less than 10% by weight of polyolefin.

The cellulose fibres present in the compositions according to the invention may be of any kind and may take any sufficiently divided form. It is thus possible to employ particles or fibres of deciduous or resinous wood, sawdust, straw scraps, paper pulp, shredded scrap paper and cellulose derivatives (methyl cellulose, cellulose acetate and the like) to prepare the mixtures.

Cellulose fibres which are in the form of particles which have an average size of between 0.1 and 3 mm and which have a water content which does not exceed 15% by weight, and preferably 10% by weight, are preferably employed. The preferred cellulose fibres are lignocellulosic materials produced from resinous or deciduous wood.

The quantities of polyolefins and of cellulose fibres present in the compositions according to the invention are not critical. However, in order to ensure a correct moulding of these compositions, it is preferred to incorporate these constituents in the proportions specified below. The cellulose fibre content of the compositions is determined in relation to the weight of polyolefin. In general, the compositions according to the invention contain 30 to 250 parts by weight of cellulose fibres per 100 parts by weight of polyolefin, preferably 70 to 150 parts per 100 parts. The best results are obtained when the compositions contain approximately equal weights of polyolefin and of cellulose fibres. An excess of polyolefin is detrimental to the economy of the compositions. A shortage of polyolefin is detrimental to their cohesion.

Apart from the polyolefin and the cellulose fibres, the compositions according to the invention also include an unsaturated organosilane.

The unsaturated organosilane is chosen from silanes containing at least one hydrolysable group bonded to silicon and at least one polymerizable unsaturated vinyl group also bonded to silicon. The presence, on the one hand, of the hydrolysable group reactive towards the hydroxyl groups of the cellulose fibres and, on the other hand, of the unsaturated vinyl group enabling the silane to be grafted onto the polyolefin ensures compatibility fibres and the polyolefin which are present in the compositions.

The hydrolysable group bonded to silicon is generally chosen from alkoxy and aryloyloxy groups and halogen atoms. The unsaturated vinyl group is generally chosen from ethylenically unsaturated groups such as, for example, vinyl, gamma-methacryloyloxypropyl, alkenyl gamma-acryloyloxypropyl, 6-acryloyloxyhexyltriethoxy, ethynyl and 2-propynyl radicals. Any valencies of silicon which are not satisfied by the abovementioned groups may be satisfied by a monovalent hydrocarbon group such as, for example, the methyl, ethyl, propyl, butyl, pentyl, octyl, cyclohexyl, benzyl, phenyl and naphthyl radicals.

Examples of unsaturated organosilanes which are suitable for the production of the compositions according to the invention are vinyltriethoxysilane, gamma-methacryloxypropyltrimethoxysilane, vinyltri(2-methoxyethoxy)silane, vinyltrimethoxysilane, vinyltrichlorosilane, gamma-methacryloxypropyltri(2-methoxyethoxy)-silane, gamma-acryloxypropyltriethoxysilane, vinyltriacetoxysilane, ethynyltriethoxysilane and 2-propynyltrichlorosilane.

Unsaturated organosilanes which are very particularly preferred are vinyltriethoxysilane and gamma-methacryloxypropyltrimethoxysilane.

According to a preferred embodiment of the invention, the organosilane defined above may be employed together with at least one of the compounds mentioned below to form a coupling system between the polyolefin and the cellulose fibres which is even more effective.

The organosilane may be combined with an organic compound containing at least two polymerizable unsaturated groups. This compound containing multiple functionalities, called more simply "organic compound" hereinafter, makes it possible to create a crosslinked phase between the polyolefin and the cellulose fibres, improving mechanical properties, resistance to chemical agents and aging resistance of compositions according to this invention.

As organic compounds which may be employed according to the invention there may be mentioned 1,4-butylene glycol diacrylate diethylene glycol dimethacrylate, triallyl mellitate, pentaerythritol triacrylate, dipentaerythritol pentaacrylate, trimethylolpropane trimaleate, N,N-tetraacryloyl-1,6-diaminopyridine, 1,3-butylene glycol dimethacrylate, ethylene glycol dimethacrylate, ethylene glycol diacrylate, diethylene glycol diacrylate, triethylene glycol diacrylate, polyethylene glycol dimethacrylate, polyethylene glycol diacrylate, trimethylolpropane trimethacrylate, trimethylolpropane triacrylate, divinyl sulphone, dicyclopentadiene, bisalkyl glycol dicarbonate, triallyl cyanurate, acetyl triallyl citrate, divinylbenzene, dialkyl phthalate, tetraallylmethylenediamine, tetraallyloxyethane, 3-methyl-1,4,6-heptatriene, 1,10-decamethylene glycol dimethacrylate and polyvinyl alcohol di-, tri-, tetra- and pentaacrylates.

Preferred organic compounds are those exhibiting a high ratio of the degree of unsaturation to molecular weight, most particularly polyvinyl alcohol tri-, tetra- and pentaacrylates and other tri-, tetra- and pentaacrylates and methacrylates of polyols such as pentaerythritol, methylolpropane and dipentaerythritol.

The organosilane may also be combined with a silicone-based surfactant chosen from polysiloxanes containing at least one $C_{1-12}$ alkyl group bonded to silicon and polyoxyalkylene-based compounds containing at least one polyoxyalkylene block bonded at one end to a siloxane block, to a $C_{1-12}$ alkyl group or to an alkenyl group and bonded at the other end to an alkoxy group, a siloxane block or a hydroxyl group. A special class of these polyoxyalkylene-based compounds consists of polysiloxane-polyoxyalkylene block copolymers which may be represented using the formula:

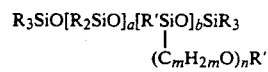

in which:

R is a $C_{1-12}$ monovalent hydrocarbon radical, preferably the methyl radical, R' is a $C_{1-18}$ monovalent hydrocarbon radical or a $C_{1-18}$ alkanoyl radical, preferably also the methyl radical, a is a number such that $a \geq 1$, preferably $1 \leq a \leq 100$, b is a number such that $b \geq 1$, preferably $1 \leq b \leq 100$, m is a number such that $m \geq 2$, preferably 2 or 3 in value, n is a number such that $n \geq 2$, preferably $2 \leq n \leq 40$.

Finally, the coupling system, which coupling system is based on an unsaturated organosilane optionally containing the organic compound and/or the silicone-based surfactant defined above, may contain a compound generating free radicals. It is preferred to choose this compound from those which have a half-life of less than 30 minutes at 130° C. Preferred compounds which generate free radicals are peroxide compounds such as dicumyl peroxide, benzoyl peroxide, tert-butyl perbenzoate, di-tert-butyl peroxide, 2,5-dimethyl-2,5-di(tert-butylperoxy)hexane, 2,5-dimethyl-2,5-di(tert-butylperoxy)hexyne, tert-butyl hydroperoxide, alpha,alpha'-di(tert-butylperoxy)diisopropylbenzene and isopropyl percarbonate.

The unsaturated organosilane is present in the compositions according to this invention in a suitable quantity to ensure compatibility is efficiently obtained between the polyolefin and the cellulose fibres. This quantity is generally between 0.05 and 10% by weight relative to the weight of cellulose fibres, preferably between 0.1 and 5% by weight.

The quantities of organic compound and silicone-based surfactant with which the organosilane may be combined to form the preferred coupling system according to the invention expressed in % by weight relative to the weight of cellulose fibres present in the composition, are generally also between 0.05 and 10% by weight, preferably between 0.1 and 5% by weight and between 0.1 and 2.5% by weight respectively.

Very good results have been recorded with coupling systems comprising the organosilane, the organic compound and the silicone-based surfactant in respective weight ratios of between 1-5/1-5/0.3-1.5, all three ingredients being present in the composition in a proportion of approximately 0.2 to 3% by weight.

If a compound generating free radicals is included, it is desirable if it is present in conventional quantities, generally between 0.005 and 5% by weight of cellulose fibres present in the compositions, preferably between 0.05 and 2.5% by weight. For convenience, this compound may be dispersed on an inorganic carrier such as a metal salt, for example, calcium carbonate. The (supported) peroxide compound preferably constitutes from approximately 10 to approximately 100% by weight of the weight of the other constituents of the coupling system.

Other details relating to the unsaturated organosilanes, organic compounds, silicone-based surfactants and compounds generating free radicals which may constitute the coupling systems described above can be found in U.S. Pat. No. 4,481,322 (Union Carbide Corporation) whose content is incorporated by reference in the present description.

These coupling systems are marketed by Union Carbide under the names Ucarsil PC-1 A and PC-1 B.

Apart from the polyolefin, the cellulose fibres, the unsaturated organosilane and the possible other ingredients constituting the coupling system described above, the compositions according to the invention may contain other materials which are compatible with these constituents, for example, non-cellulose fibres and reinforcing synthetic elastomers; they may also contain the usual additives for processing thermoplastic polymers, such as lubricants, stabilizers, pigments, and the like. It is preferable, however, that the compositions should contain at least 80% by weight of polyolefins and of cellulose fibres, and preferably at least 90% by weight.

The present invention also relates to a process for manufacturing the moulding compositions described above. This process consists in kneading a molten mixture obtained by incorporating the cellulose fibres in the premelted polyolefin containing the unsaturated organosilane and the other possible ingredients of the coupling system.

The addition and the incorporation of the constituents of the mixture may be carried out by any means known for this purpose which is also compatible with their physical state. In particular, the unsaturated organosilane may be in solid or liquid form and may be distributed into the polyolefin, itself in a solid or molten form, using any suitable device ensuring the incorporation of a small quantity of a liquid or of a solid in a larger quantity of another, possibly molten, solid.

To obtain compositions which have the characteristic properties of those of this invention, it is essential to incorporate the cellulose fibres in the polyolefin after the preliminary incorporation of the unsaturated organosilane. The respective quantities of the various remaining constituents to be mixed have been detailed above.

The kneading may be carried out by any known means for this purpose. Thus, it is possible to work with mixers of the external type or of the internal type, the difference being of no consequence. For technical, ecological and economic reasons, however, it is preferred to work with mixers of the internal type and more precisely with extruders, which form a special class of internal mixers. Extruders with screws which rotate together are very particularly preferred.

The kneading may be carried out under standard conditions for working polyolefin objects, which are well known to the specialist.

The maximum temperature applicable during the kneading is not in itself critical and is limited in practice by the nature and the decomposition temperatures of the constituents of the polyolefin-based composition. The work is generally carried out at temperatures not exceeding 250° C., preferably at temperatures not exceeding approximately 220° C.

The period of kneading at elevated temperature is chosen bearing in mind the nature of the polyolefin and of the cellulose fibres and the temperature applied. This period is generally between 5 seconds and 30 minutes and in most cases between 10 seconds and 15 minutes. It is preferred to work for periods of between 30 seconds and 10 minutes.

After being kneaded, the compositions are in a doughlike form and can be moulded by the conventional techniques for moulding plastics, such as extrusion, injection, pressing or calendering. They are therefore advantageously converted directly, either into their definitive form, for example a profile, or into a semifinished form, for example a plaque. The objects wrought from these compositions also constitute one of the aspects of the invention.

The wrought objects thus obtained may be employed in many applications. A particularly advantageous application is the manufacture of plaques by extrusion by means of a flat die or by calendering. These plaques may be subsequently converted, directly or after storage, either under pressure in cold or heated moulds, or by vacuum-thermoforming, in this latter case optionally after having been clad with a suitable decorative sheet, for manufacturing objects such as interior trim panels of parts of motor vehicles (doors, boots, and the like).

The invention is described in detail by the examples which follow.

EXAMPLE 1

A Clextral BC 45 twin-screw extruder, with the screws rotating together, in which the barrel temperature is 200° C. and the die temperature 220° C., is fed:

(a) via the hopper, with powdered polypropylene (PP) marketed under the name Eltex P HL 402, to which has been added a coupling system marketed under the names Ucarsil PC-1A (Y-9777) and PC-1B (Y-9771) by Union Carbide), (b) via the fourth module of the extruder—that is to say at a location in the extruder where the PP is molten—with heated or dried beech sawdust.

The PP, the sawdust and the coupling system are introduced in quantities suited to obtaining an extruded composition comprising 54% by weight of PP, 45% of sawdust and 1% of the coupling system.

This composition leaves the extruder through a flat die in the form of a sheet which is then made smooth between the rolls of a hot polishing calender. The main properties of the sheet obtained are collated in Table I below.

EXAMPLE 2 (FOR COMPARISON)

The test of Example 1 is repeated, the extruder being fed with sawdust via the hopper and with PP, to which the coupling system has been added, via a satellite extruder feeding the fourth module.

The properties of the sheet obtained are collated in Table I.

EXAMPLE 3 (FOR COMPARISON)

The test of Example 1 is repeated, the extruder being fed, via the hopper, with all the ingredients of the composition, premixed cold in a blender-homogenizer.

The properties of the sheet obtained are collated in Table I.

EXAMPLE 4 (FOR COMPARISON)

The test of Example 1 is repeated, except that the extruder is fed, via the hopper, with the PP, which has been modified using the coupling system in the course of a prior pass, without sawdust, through the same extruder, followed by a grinding operation.

The properties of the sheet obtained are collated in Table I.

EXAMPLE 5 (FOR COMPARISON)

To reproduce the process consisting of extruding PP compounded with 50% by weight of wood flour in the presence of 1% as total weight of the coupling system (E. A. Coleman, "Reinforcement of Polymer with filler" in "Society of Plastics Industry—Technical Proceedings" (SPI/SPE '84), 21-23 June 1984, page 285, left column), the product resulting from grinding the extrudate obtained according to Example 1 is reintroduced into the hopper of the extruder of this example.

The properties of the sheet obtained out of this second pass through the extruder are collated in Table I.

TABLE I

| | EXAMPLES | | | | |
|---|---|---|---|---|---|
| | 1 according to the invention | 2 | 3 | 4 | 5 |
| | | | for comparison | | |
| Modulus (E) measured at 23° C. (MPa) | 5170 | 4915 | 4530 | 4120 | 4430 |
| 100° C. (MPa) (DIN standard 53457) | 1450 | 1180 | 1010 | 1250 | 1090 |
| Impact strength (unnotched test piece) (DIN standard 53453) (kJ/m$^2$) | 6.3 | 7.9 | 8.5 | 6.5 | 9.9 |
| G'/G" ratio at 200° C. and at 0.1 rad/s (0.1 s$^{-1}$) | 0.95 | 0.56 | 0.47 | 0.79 | 0.64 |

These results show that only the process of the invention makes it possible to obtain compositions exhibiting an optimum compromise of high-temperature rigidity (modulus (E)) and impact strength, combined with a high ratio of the moduli G'/G".

We claim:

1. Moulding compositions comprising a polyolefin, cellulose fibres and an unsaturated organosilane, characterized by a tensile elasticity modulus (E), measured at 100° C., higher than 1250 MPa.

2. Moulding compositions comprising a polyolefin, cellulose fibres and an unsaturated organosilane, characterized by a ratio G'/G" of their modulus G', representing their elastic response, to their loss modulus G", measured at 200° C. and 0.1 s$^{-1}$, with a value of at least 0.80.

3. Compositions according to claim 2, characterized by a G'/G" ratio of between 0.85 and 1.

4. Compositions according to claim 1, characterized in that the unsaturated organosilane contains at least one hydrolysable group and at least one polymerizable unsaturated vinyl group which are bonded to silicon.

5. Compositions according to claim 1, characterized in that the unsaturated organosilane is combined with an organic compound containing at least two polymerizable unsaturated groups.

6. Compositions according to claim 1, characterized in that the unsaturated organosilane is combined with a silicone-based surfactant.

7. Compositions according to claim 1, characterized in that the organosilane is combined with a compound generating free radicals.

8. Compositions according to claim 1, characterized in that they contain 30 to 250 parts by weight of cellulose fibres per 100 parts by weight of polyolefin.

9. Compositions according to claim 1, characterized in that they contain between 0.05 and 10% by weight of unsaturated organosilane relative to the weight of cellulose fibres.

10. Compositions according to any one of claims 1 to 9, characterized in that they contain:
    between 0.05 and 10% by weight, relative to the weight of the cellulose fibres, of an organic compound containing at least two polymerizable unsaturated groups,
    between 0.05 and 10% by weight of a silicone-based surfactant, and
    between 0.005 and 5% by weight of a compound generating free radicals.

11. Objects wrought from moulding compositions according to claim 1.

12. Moulding compositions according to claim 1, characterized in that they are produced by kneading the cellulose fibres in the premelted polyolefin containing the unsaturated organosilane.

13. Objects wrought from moulding compositions according to claim 12, characterized in that the kneaded mixture is converted directly into the objects so wrought.

* * * * *